July 26, 1949.  E. WENK, JR., ET AL  2,477,026
ELECTRIC FLUID PRESSURE GAUGE
Filed Sept. 20, 1946
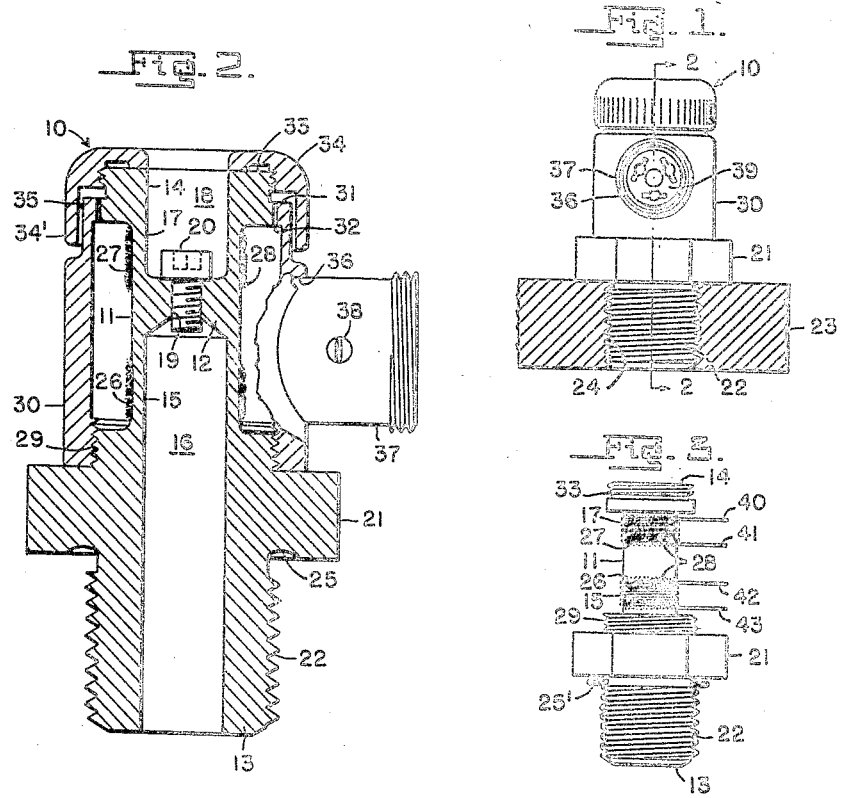
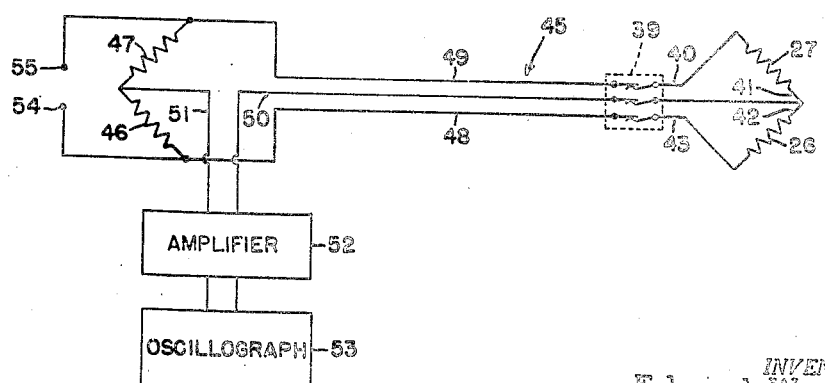
INVENTORS.
Edward Wenk, Jr.
Russell S. Thatcher
BY
ATTORNEY.

Patented July 26, 1949

2,477,026

UNITED STATES PATENT OFFICE 2,477,026

ELECTRIC FLUID PRESSURE GAUGE

Edward Wenk, Jr., Cabin John, Md., and Russell S. Thatcher, Flint, Mich.

Application September 20, 1946, Serial No. 698,086

4 Claims. (Cl. 201—48)

(Granted under the act of March 3, 1883, as amended April 30, 1928; 370 O. G. 757)

The invention relates to improvements in fluid pressure gages and more specifically to an improved fluid pressure gage which employs an electric resistance strain wire for the sensitive element.

An important object of the present invention is to provide an electric wire resistance type gage having means automatically compensating for temperature changes.

Another object of the invention is to provide a gage so constructed that it will measure high fluid pressures and which can be built in small size so that its natural frequency will be high.

A further object is the provision of a gage of the type described which may be used to measure static or dynamic pressures.

A still further object is the provision of a gage of the character described which has a linear calibration.

The invention also aims to provide a gage as described which does not exhibit changes in sensitivity over short periods of time or for different ranges of temperature, and which is insensitive to external forces and acceleration which might produce signals in the gage.

Another object of the invention is the provision of a fluid pressure gage having means to bleed air from the pressure chamber thereof.

A still further object is to provide a gage of the electric wire resistance type having a shield for mechanical protection of the strain elements.

An additional object is to provide a gage of the type described having readily removable and replaceable parts including an electrical connector.

Yet another object is the provision of a gage as described of relatively simple tubular design which permits use for various pressure ranges from 150 to 25,000 pounds per square inch merely by varying the thickness of the tube.

Other objects and advantages of the invention will become apparent during the course of the following detailed description, taken in connection with the accompanying drawing, forming a part of this specification, and in which drawing:

Figure 1 is a front elevational view of the improved gage.

Figure 2 is a view partly in side elevation and partly in central vertical section substantially on the line 2—2 of Figure 1.

Figure 3 is a side elevational view of the gage with its outer shield and cap removed.

Figure 4 is a diagrammatic view of a Wheatstone bridge circuit suitable for use with the gage.

In the drawing, which for the purpose of illustration shows only a preferred embodiment of the invention, and wherein similar reference characters denote corresponding parts throughout the views, the numeral 10 generally designates the gage which consists essentially of an elastic tube 11 divided by a partition 12 into opposite end portions 13, 14. The elastic tube 11 preferably is formed of high strength steel although for some applications other metals or even moldable plastics may be used.

The end portion 13 includes an active section 15 adjacent the partion 12 and defines a chamber 16 adapted to receive a fluid under pressure to be measured. The other end portion 14 includes a temperature compensating section 17 also adjacent the partition 12 and defines a chamber 18 open to the atmosphere which can be considered a constant pressure datum.

Inasmuch as the presence of air bubbles in the pressure-active tube portion 13 would seriously interfere with its response to higher frequency transients in a hydraulic system, the partition 12 is provided with an opening 19 normally sealed by a screw plug 20 which may be removed to bleed the gage.

The elastic tube 11 is provided with a hexagonal base 21 and a threaded shank 22 for attachment to a pressure container or wall 23 having a tapped opening 24. The base 21 may be grooved at 25 to receive an annular gasket 25' serving in the usual manner as a pressure seal.

In the example shown, strain wires 26, 27 are helically wound around sections 15, 17 and bonded thereto as by adhesive 28 to form wire resistance strain elements. It will of course be understood that commercially available Metalectric strain elements disposed circumferentially of the tube at sections 15, 17 may be used instead of the helical windings 26, 27.

Threaded on an enlargement 29 of the tube adjacent its active section 15 is a brass sleeve 30 disposed in spaced mechanically shielding relation to the strain wires 26, 27. At its free end portion 31, the sleeve 30 defines a small clearance space 32 around the lower portion of an external annular reinforcement 33 at the temperature compensating end portion 14 of the tube. Threaded on the upper portion of the annular reinforcement 33 is aluminum cap 34 having a depending skirt portion 34' encirclingly overlapping the sleeve 30 with a small clearance space 35.

Soldered or otherwise fixed to the sleeve 30 intermediate its ends at a side opening 36 is a tubular socket member 37 within which is secured, as by a set screw 38, a conventional Amphenol three-wire connector member 39. Upon assembly of the gage, the terminals 40, 41, 42, 43, of the strain wires 26, 27 are connected to the Amphenol connector member 39, it being understood that two of the terminals, say 41 and 42, form a common lead.

Circumferential strains in the tube resulting from variations of internal pressure will produce changes in resistance of the strain wire forming the active element. Thus when the strain wire 26 is connected into a suitable Wheatstone bridge circuit variations in resistance will unbalance the bridge by an amount proportional to the pressure, and this electrical unbalance can be easily measured or recorded. By applying a previously determined gage sensitivity factor, the measured unbalance can be converted into the desired pressure units.

Inasmuch as the resistance of strain wire is a function of changes in temperature as well as in length, compensation for temperature effects is required in many applications. In the present invention, this compensation is automatically obtained by mounting the strain element 27 on the outside of the portion 14 of tube exposed to the atmosphere. Since this strain element 27 is adjacent the active strain element 26, the temperature at both tends to be equal. Thus, by connecting these two strain elements 26, 27 in adjacent arms of a bridge circuit 45, such as shown in Figure 4, temperature effects will be electrically cancelled, provided the gage is limited in use to temperatures less than 150 degrees Fahrenheit. At higher temperatures, the performance of wire resistance strain elements is erratic. Although the temperature compensating portion 17 is in close proximity to and integral with the pressure sensitive portion 15, it will be noted that formation of the temperature compensating portion with changes in the pressure sensitive portion will be eliminated or minimized by the provision of the partition 12 and annular reinforcement 33. Use of the reinforcement 33 on the tube 11 with the enlargement 29 tends to achieve strain symmetry along the gage portions of the tube between the reinforcement and the enlargement.

Various systems of electronic amplification have proven suitable for use with the gage, and each system has certain merits; the selection of equipment depends on the characteristics of the transient to be measured. In the system shown in Figure 4, the bridge 45 includes two resistors 46, 47 connected at the Amphenol connector member 39 to the terminals 40, 43 of the strain elements 26, 27 as by two conductors 48, 49 of a three-wire cable. Also connected at the Amphenol connector member 39 to the common lead 41, 42 of the strain elements 26, 27 is the third conductor 50 of the cable, which with conductor 51, transmits the electrical output of the bridge to a suitable amplifier 52 which is in turn connected to an oscillograph or recorder 53. The input terminals 54, 55 are connected to a suitable current source which may be either direct or alternating, it being understood that the amplifier 52 and oscillograph 53 are adapted for use with the type of current source selected.

The sensitivity of the pressure gage is a function of the wall thickness and diameter of the tube and of the properties of the material employed. The present gage is designed to measure fluid pressure of the order of 5,000 pounds per square inch and to have a very high natural frequency. It has been used with good results to measure transients up to 500 cycles per second. It has been determined from tests that 2,500 microinches per inch is the optimum strain at peak load that permits measurements with a precision of one percent. To achieve these high strains while at the same time maintaining the size of the tube at a minimum for requirements of high natural frequency, the wall of the tube was made as thin as practicable.

The gage was calibrated statically with pressures applied by a hand pump and measured with Bourdon-tube gages having a precision of ½ percent of full scale reading. The pressure gage output was measured with a Baldwin Southwark SR-4 indicator in strain units to the closest 5 microinches per inch. The relationship of the applied pressures to the measured strains was found linear with deviation of less than 2 percent of all test pressure values. Calibrations were performed at 20, 70 and 120 degrees Fahrenheit to determine the effectiveness of temperature compensation and variation in gage sensitivity at extreme ambient temperatures. The maximum zero shift has been found less than 50 microinches per inch and variation in sensitivity less than one percent.

The accuracy of the gage for measuring transient phenomena, determined by dynamic tests during which pressures were simultaneously measured with a piezoelectric crystal gage and a magnetic type gage, was within one percent. From these test results, it is clear that dynamic as well as static pressures can be measured with a precision of better than 2 percent.

Various changes may be made in the form of invention herein shown and described without departing from the spirit of the invention or the scope of the following claims.

The invention described herein may be manufactured and used by or for the Government of the United States of America for governmental purposes without the payment of any royalties thereon or therefor.

We claim:

1. In a fluid pressure gage, an elastic tube, a fluid-tight partition intermediate the ends of the tube, said partition dividing the tube into opposite end portions, one of said end portions constituting an active section defining a chamber adapted to receive a fluid under pressure to be measured, the other of said end portions constituting a temperature compensating section defining a chamber isolated from said fluid by said partition, said active and temperature compensating sections being integral and of like cross-sectional dimensions, a wire resistance strain element adhered to and extending substantially circumferentially of the active section of said elastic tube, and another wire resistance strain element adhered to and extending substantially circumferentially of the temperature compensating section of the tube.

2. In a fluid pressure gage, an elastic tube, a partition intermediate the ends of the tube, said partition dividing the tube into opposite end portions, one of said end portions constituting an active section defining a chamber adapted to receive a fluid under pressure to be measured, the other of said end portions constituting a temperature compensating section defining a chamber exposed to the atmosphere and normally isolated from said fluid by said partition, said active and temperature compensating sections being integral and of like cross-sectional dimensions, a wire resistance strain element adhered to and extending substantially circumferentially of the active section of said elastic tube, another wire resistance strain element adhered to and extending substantially circumferentially of the temperature compensating section of the tube, said partition being provided with an opening, and a removable closure normally sealing said opening against the escape of said fluid under pressure.

3. In a fluid pressure gage, an elastic tube, a fluid-tight partition intermediate the ends of the tube, said partition dividing the tube into opposite end portions, one of said end portions constituting an active section defining a chamber adapted to receive a fluid under pressure to be measured, the other of said end portions constituting a temperature compensating section defining a chamber isolated from said fluid by said partition, said active and temperature compensating sections being integral and of like cross-sectional dimensions, a wire resistance strain element adhered to and extending substantially circumferentially of the active section of said elastic tube, another wire resistance strain element adhered to and extending substantially circumferentially of the temperature compensating section of the tube, said tube at its temperature compensating end portion terminating in an integral annular reinforcement adjacent said temperature compensating strain element and being provided at its active end portion with an integral reinforcement adjacent said active strain element, said reinforcements being shaped to provide substantial strain symmetry of said tube between said reinforcements.

4. In a fluid pressure gage, an elastic tube, a partition intermediate the ends of the tube, said partition dividing the tube into opposite end portions, one of said end portions constituting an active section defining a chamber adapted to receive a fluid under pressure to be measured, the other of said end portions constituting a temperature compensating section defining a chamber, a wire resistance strain element adhered to and extending substantially circumferentially of the active section of said elastic tube, another wire resistance strain element adhered to and extending substantially circumferentially of the temperature compensating section of the tube, said tube at its temperature compensating end portion being provided with an external annular reinforcement adjacent said temperature compensating strain element, and at its active end portion being provided with an external enlargement adjacent said active strain element, a sleeve supported by said enlargement in spaced shielding relation to said strain elements, and a cap carried by said annular reinforcement, said cap being provided with a skirt portion disposed in spaced overlapping relation to said sleeve.

EDWARD WENK, Jr.
RUSSELL S. THATCHER.

REFERENCES CITED

The following references are of record in the file of this patent:

UNITED STATES PATENTS

| Number | Name | Date |
| --- | --- | --- |
| 2,336,500 | Osterberg | Dec. 14, 1943 |
| 2,398,372 | Green | Apr. 16, 1946 |
| 2,421,907 | Postlewaite | June 10, 1947 |